United States Patent [19]

Delahoussaye et al.

[11] Patent Number: 4,537,415

[45] Date of Patent: Aug. 27, 1985

[54] DYNAMIC BRAKE FOR MANUAL WHEELCHAIR

[75] Inventors: Ronald D. Delahoussaye, Ruston, La.; Gary W. Kelly, Atlanta, Ga.

[73] Assignee: Georgia Tech Research Institute, Atlanta, Ga.

[21] Appl. No.: 583,407

[22] Filed: Feb. 24, 1984

[51] Int. Cl.³ .............................................. B62M 1/14
[52] U.S. Cl. ............................ 280/242 WC; 188/2 F; 188/84; 297/DIG. 4
[58] Field of Search ............... 280/242 WC, 289 WC, 280/647; 180/907; 297/DIG. 4; 188/84, 2 F, 41, 38

[56] References Cited

U.S. PATENT DOCUMENTS 3,679,257 7/1972 Jacuzzi et al. ............... 297/DIG. 4
3,897,857 8/1975 Rodaway .................... 280/242 WC
4,462,605 7/1984 Morgan et al. ............... 297/DIG. 4

Primary Examiner—Joseph F. Peters, Jr.
Assistant Examiner—Charles R. Watts
Attorney, Agent, or Firm—Newton, Hopkins & Ormsby

[57] ABSTRACT

To substantially reduce the physical effort required to slow or stop a manually propelled wheelchair, the customary propulsion ring attached to the outer side of each main chair wheel is mounted on the wheel for limited inward axial movement under manual pressure and is biased outwardly by spring force. A brake ring of similar diameter near the interior side of each wheel in a plane parallel to the plane occupied by the propulsion ring is connected directly with the propulsion ring. An opposing friction brake shoe attached to the chair frame is engaged by the brake ring to slow or stop the chair whenever the chair occupant pushes the propulsion ring axially inwardly.

12 Claims, 4 Drawing Figures

DYNAMIC BRAKE FOR MANUAL WHEELCHAIR

CROSS-REFERENCE TO RELATED APPLICATION

This application contains some subject matter in common with prior application Ser. No. 06/508,603, filed June 28, 1983, now U.S. Pat. No. 4,462,605, for WHEELCHAIR HAVING ANTI-ROLLBACK MECHANISM.

BACKGROUND OF THE INVENTION

The referenced prior application discloses a wheelchair anti-rollback mechanism involving a one-way engaging clutch and a chair wheel mounted manual mechanism to activate and de-activate the clutch in which the chair occupant need never remove his or her hands from the customary chair propulsion rings mounted near the outer sides of the chair main wheels. The arrangement eliminates the possibility of loss of control of the chair, which could occur if the chair occupant was required to release the wheel propulsion rings in order to operate another mechanism. The present invention is founded on the same principle of operation, namely, that a chair occupant need not remove his or her hands from the chair propulsion rings adjacent to the chair main wheels, when operating the brake mechanism forming the subject matter of this invention.

An object of the invention is to provide a manual wheelchair brake of highly simplified construction which is convenient to operate by a chair occupant having minimal arm and hand strength, and requiring significantly less effort to operate in comparison to slowing or stopping the chair solely by gripping and retarding the chair propulsion rings with the hands.

Another object of the invention is to provide a dynamic brake for a wheelchair which is direct-acting in response to lateral hand pressure against the outer sides of the chair propulsion rings.

Still another object is to provide a wheelchair brake of the above type which is resiliently biased toward a release or inactive position.

Another object is to provide a manual brake for wheelchairs which is relatively inexpensive to manufacture and install on chairs, requiring only minimal structural modification of conventional manually propelled wheelchairs.

Other objects and advantages of the invention will become apparent during the course of the following description.

DETAILED DESCRIPTION

Figure 1:
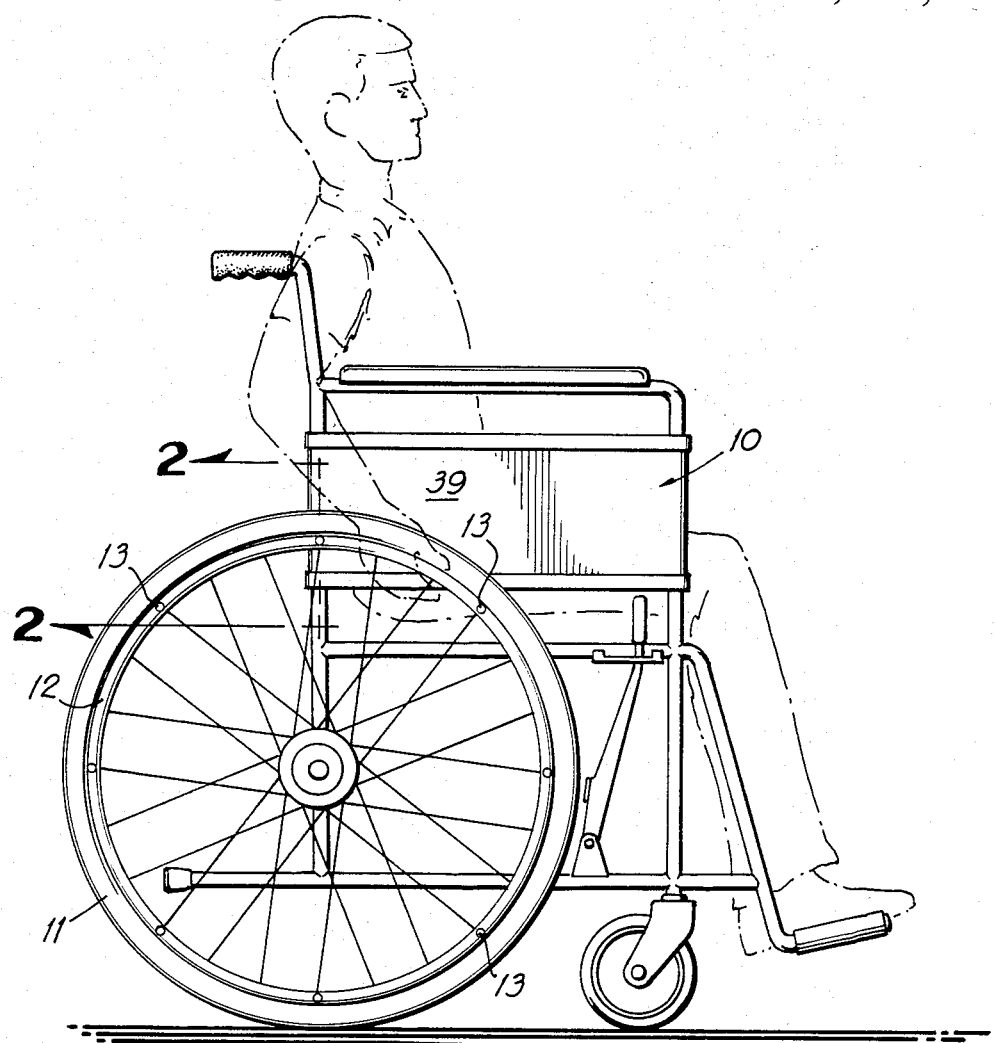
FIG. 1 is a side elevation of a wheelchair equipped with a dynamic brake according to the present invention.

Referring to the drawings in detail, wherein like numerals designate like parts, a conventional manual wheelchair 10 is shown, whose main wheels 11 are equipped near their outer sides with the customary round cross-section manual propulsion rings 12. Rather than being fixed or rigid on the wheels 11, in the customary manner, each propulsion ring 12 is attached by screws 13 or the like with a plurality of axially shiftable mounting rods 14 arranged in circumferentially equidistantly spaced relationship around each wheel 11.

The rods 14 are supported by a corresponding number of low friction bearings 15 securely attached as at 16 to the interior face of each wheel 11. The several rods 14 are biased axially outwardly toward brake release positions by compression springs 17 surrounding the rods 14 between the outer end faces of the bearings 15 and washers 18 fixed on the rods 14 near their outer ends.

Round cross-section brake rings 19 are attached by screws 20 or the like to the interior ends of the rods 14, and are positioned near the inner sides of the chair wheels 11. Preferably, the brake rings 19 are of the same diameters as the propulsion rings 12 and are disposed in vertical planes parallel to the planes occupied by the rings 12.

The brake rings 19 cooperate with friction brake pads 21, or shoe elements, secured within channel holders 22, carrying threaded studs 23. These studs are received through apertures 24 of an anchor block 25 having two perpendicular plate portions 26. A square shoulder 27 of the anchor block 25, together with the two right angular plate portions 26, defines a pair of seats for the brake pads 21 and their channel holders 22 on the anchor block 25, nuts 28 being provided for engagement on the threaded studs 23, to secure the two brake pads 21 in place in perpendicular relationship. The pads 21 are rectangular in cross-section and their forward faces 29 are perpendicular for engagement with the round cross-section brake ring 19 with a wedge-like frictional engagement, whenever the brake is applied by a chair occupant.

Near its corner, the anchor block 25 has a through opening 30 whose axis is parallel to the brake pad faces 29. This opening 30 loosely receives therethrough a pivot shaft 31 which also engages through aligned support apertures 32 in the two side walls 33 of a U-shaped mounting bracket 34, the anchor block 25 engaging closely between the side walls 33. The back wall 35 of bracket 34 is slotted at its top and bottom as at 36 and 37 to receive mounting screws 38 which rigidly secure the bracket 34 to the adjacent side wall 39 of the wheelchair frame structure. By virtue of the slots 36 and 37, the bracket 34 is rendered adjustable on the chair frame. The anchor block 25 is freely pivotally held on the bracket for vertical swinging movement between the bracket side walls 33.

Figure 2:
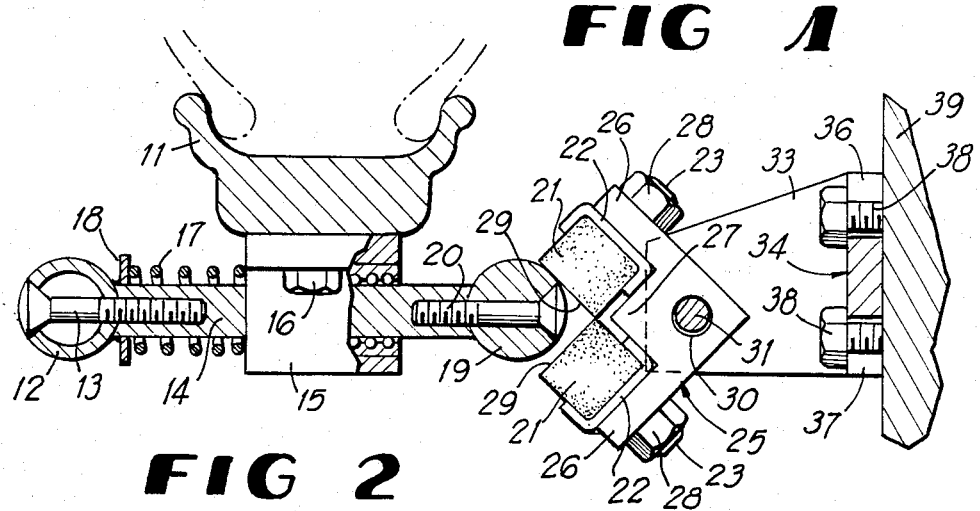
FIG. 2 is an enlarged fragmentary vertical section taken on line 2—2 of FIG. 1 showing the brake mechanism in a normal release position.
Figure 3:
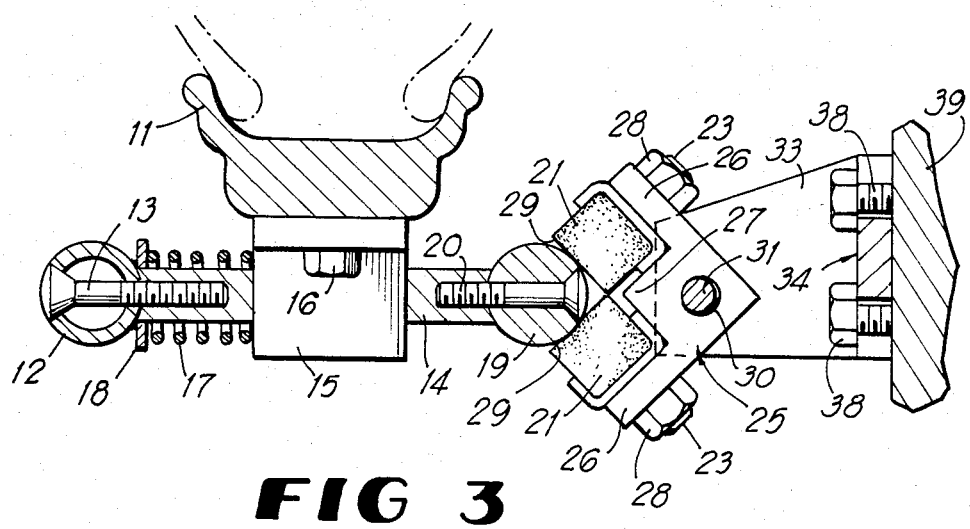
FIG. 3 is a similar view showing the brake mechanism actively engaged.
Figure 4:
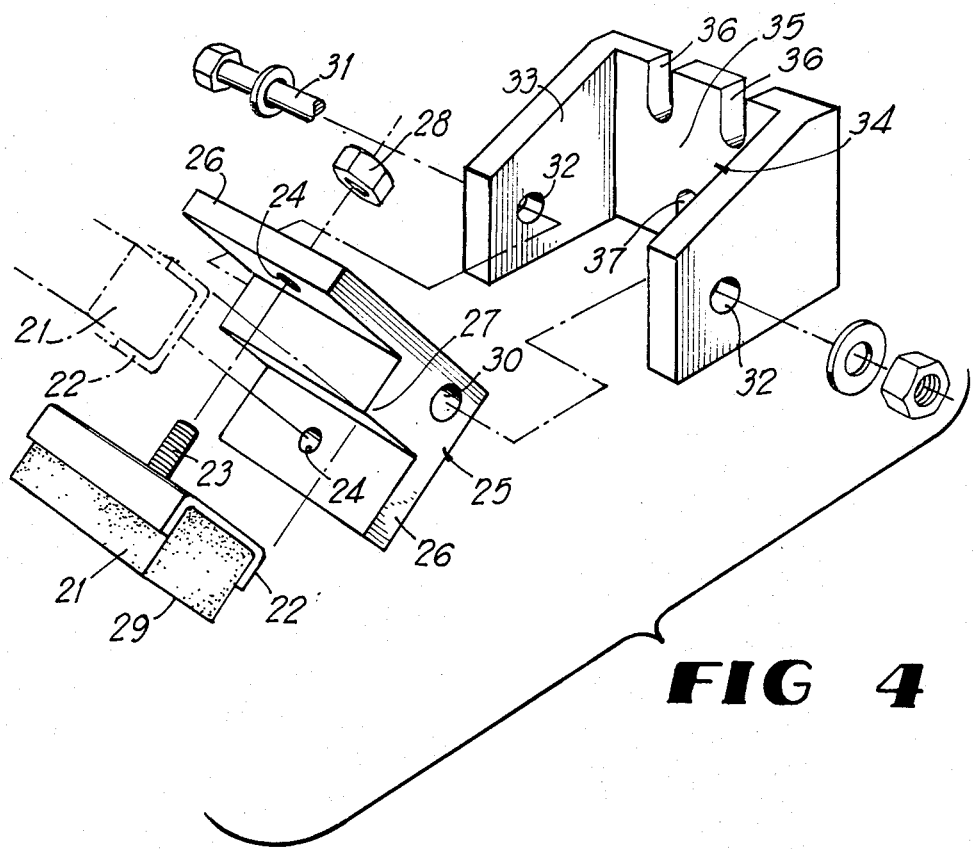
FIG. 4 is an exploded perspective view of brake shoe components.

In use, the wheelchair occupant wishing to slow down or stop the chair exerts hand and arm pressure laterally on the propulsion rings 12, shifting the axial rods 14 and the brake ring 19 inwardly toward the center of the chair, the springs 17 yielding to permit this action. The resulting movement of the brake ring 19 wedges it into frictional engagement with the two brake pads or shoe elements 21, FIG. 3, held on the chair frame side 39. When the brake is thus manually engaged, the pivoted anchor block 25 centers itself automatically on the shaft 31 for the most efficient frictional action with the brake ring 19, FIG. 3. When manual pressure on the propulsion ring 12 is released, the springs 17 move the rods 14 with brake ring 19 to a brake release position, FIG. 2, where the upper pad 21 simply rides freely on the brake ring 19 and in no way impedes the normal propulsion of the chair by its occupant through use of the propulsion rings 12.

The mechanism is simple, efficient and convenient to use. Even chair occupants with diminished hand and arm strength are able to control chair movement more readily than could be accomplished by gripping the two propulsion rings 12 in the customary manner. The advantages which are present in the invention will now be readily recognized by those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. In a manually propelled wheelchair having a pair of manual propulsion rings disposed adjacent to the outer sides of the two main wheels of the chair, a brake means comprising a brake ring disposed adjacent to the interior side of each main wheel, axially shiftable means connecting each propulsion ring and brake ring and responding to hand pressure applied laterally to each propulsion ring to move such ring and the associated brake ring axially inwardly relative to each main wheel, and a cooperative friction brake means attached to each side of the wheelchair structure in opposing relationship to each brake ring and becoming engaged with each brake ring to slow or stop the wheelchair when the brake ring is shifted axially inwardly by a chair occupant.

2. In a manually propelled wheelchair as defined in claim 1, and said cooperative friction brake means comprising a fixed mounting bracket on the chair structure disposed inwardly of each main wheel of the chair, a pivoted anchor element attached to each mounting bracket and being vertically swingable thereon, and friction surface means carried by the pivoted anchor element and being directly engageable with each brake ring.

3. In a manually propelled wheelchair as defined in claim 2, and said brake ring being of round cross-section, and the friction surface means including two substantially right angular friction faces adapted to receive the brake ring wedgingly therebetween.

4. In a manually propelled wheelchair as defined in claim 1, and spring means connected with said axially shiftable means to bias the latter with said brake ring away from active engagement with said cooperative friction brake means.

5. In a manually propelled wheelchair as defined in claim 4, and the axially shiftable means comprising a plurality of axially shiftable support rods carrying each manual propulsion ring and brake ring in spaced relationship, and a corresponding number of support bearings on each main wheel receiving said axially shiftable support rods therethrough.

6. In a manually propelled wheelchair as defined in claim 5, and compression springs surrounding said axially shiftable support rods between each propulsion ring and each support bearing.

7. In a manually propelled wheelchair having a manual propulsion ring near the outer side of each main wheel of the chair, a brake ring disposed near the interior side of the main wheel in a plane substantially parallel to the plane occupied by the propulsion ring, axially shiftable support means interconnecting the propulsion and brake rings and being guidingly engaged with said main wheel, whereby lateral pressure on the propulsion ring will shift the propulsion ring and brake ring axially inwardly relative to the main wheel, resilient means opposing the inward shifting of the propulsion and brake rings relative to the main wheel, and a cooperative friction brake shoe means on the wheelchair laterally inwardly of the main wheel and being in opposing relationship to the brake ring.

8. In a manually propelled wheelchair as defined in claim 7, and said cooperative friction brake shoe means comprising a fixed mounting bracket on the wheelchair, a freely swingable pivoted anchor element on the mounting bracket, and a pair of divergent face friction brake elements on the anchor element having straddling relationship to said brake ring.

9. In a manually propelled wheelchair as defined in claim 8, and the brake ring having a substantially round cross section and said friction brake elements comprising substantially rectangular block elements.

10. In a manually propelled wheelchair as defined in claim 9, and said pivoted anchor element having two divergent wall portions forming seats for said friction brake elements, and means releasably securing the friction brake elements on said seats.

11. In a wheelchair, a main wheel, a manual propulsion ring disposed near the outer side of the main wheel, a friction brake ring disposed near the inner side of the main wheel, reciprocatory spring-biased means interconnecting the manual propulsion and friction brake rings and being movable on a path parallel to the rotational axis of the main wheel, and a wheelchair attached friction brake shoe means in opposing cooperative relationship to the friction brake ring.

12. In a wheelchair as defined in claim 11, and said brake shoe means including a pivoted element swingable across the circumferential axis of the friction brake ring and divergent face friction elements carried by said pivoted element and being in partial straddling engagement with the friction brake ring and being self-aligning relative to the friction brake ring.

* * * * *